Jan. 20, 1970     R. BEADLE     3,491,226
ELECTRON-BEAM WELDING

Filed April 2, 1968     2 Sheets-Sheet 1

United States Patent Office 3,491,226
Patented Jan. 20, 1970

3,491,226
ELECTRON-BEAM WELDING
Reginald Beadle, Camberley, Surrey, England, assignor to Vickers Limited, London, England, a British company
Filed Apr. 2, 1968, Ser. No. 718,081
Claims priority, application Great Britain, May 15, 1967, 22,507/67
Int. Cl. B23k 9/00
U.S. Cl. 219—121                                     4 Claims

ABSTRACT OF THE DISCLOSURE

An electron-beam welding process in which the electron gun is electrically insulated from the walls of an electrically-conductive housing bounding the work chamber. The workpiece in the chamber is electrically connected to the chamber walls, and the current from those walls is fed back to the electron-gun power supply via a meter for indicating the true welding current impinging on the workpiece. Electrons removed from the beam by electrodes or stops in the electron gun are returned to the power supply via additional electrical connections, without passing through the meter, whereby the electrically-conductive housing defining the said chamber itself acts as a Faraday chamber for monitoring the true beam current impinging on the workpiece.

---

This invention relates to electron-beam welding, and is more particularly concerned with monitoring the electron-beam welding current, i.e. the electric current delivered to the work-piece by way of the electron-beam which effects the welding.

The invention is described in detail in connection with an embodiment of the prior art, particularly in connection with the accompanying drawing, in which like reference numerals refer to like elements in the two figures, and in which.

Figure 1:
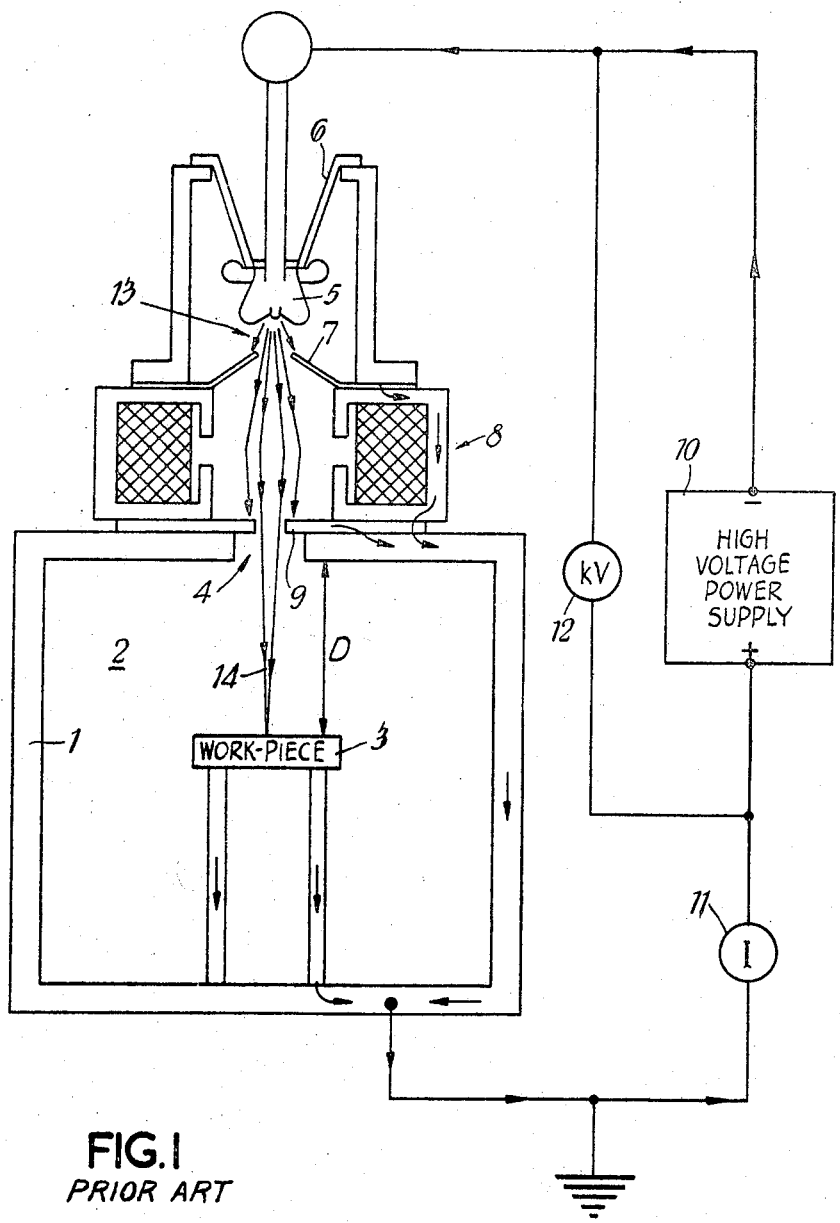
FIG. 1 is a diagrammatic, axial sectional view of a prior art apparatus.

In order to describe the prior art, reference will now be made to FIG. 1 of the accompanying drawings, is which shows a known apparatus with the electrical connections used in a known electron-beam welding process. The apparatus shown comprises an electrically-conductive housing 1, the inner surface of which provides the defining boundary of a vacuum chamber 2 in which a work-piece 3 is mounted in electrically-conductive connection with the housing 1. The housing is formed with a circular aperture 4.

An electron gun for providing the welding beam includes a cathode assembly 5, supported by means of an electrically-insulating mounting 6, and an anode 7. The anode 7 is mounted upon an electron-optical lens device 8, having an electrically-conductive casing, which is in turn mounted upon an electrically-conductive beam stop 9. The stop 9 is mounted upon the housing 1 so that the beam-limiting aperture of the stop 9 is substantially co-axial with the aperture 4 of the housing. An electrically-conductive connection between the anode 7 and the housing 1 is thus provided by the aforesaid casing, of the lens device 8, together with the stop 9.

An H.T. (high tension) power supply 10 has its negative pole connected to the cathode assembly 5, and its positive pole connected through a current meter 11 to the housing 1 which, for the sake of the safety of the operators, is earthed. The working voltage (accelerating voltage) of the electron gun is indicated by a voltmeter 12 connected across the power supply 10.

In operation, the cathode assembly 5 emits electrons 13, some of which are focused and passed through the beam stop 9 and the aperture 4 to impinge as a welding beam 14 on the work-piece 3. However, peripheral electrons 13 emitted by the cathode are intercepted by the anode 7 and by the beam stop 9 before the beam reaches the aperture 4, and so do not form part of the welding beam 14 falling upon the work-piece. Of the electron-beam welding current reaching the work-piece 3, some of this current passes directly via the housing 1 and current meter 11 to the power supply. Some of the current reaching the work-piece 3, however, is lost therefrom by way of the emission of secondary electrons, but these are generally collected by the walls of the chamber 1 and returned through the meter 11 to the power supply. Thus, substantially all of the electron-beam current entering the chamber 2 and reaching the work-piece 3 eventually returns to the power supply via the current meter 11. However, any electrons intercepted by the anode and beam stop of the electron gun, and by any other beam-limiting stops used in the gun, also return to the power supply via the meter 11. The current indicated by the meter 11 therefore tends to be somewhat higher than the actual electron-beam current falling upon the work-piece 3 and effecting the welding.

Now, if electron-beam welds are to be made reproducibly it is most desirable that the welding conditions should be controllable to a high degree of accuracy. An important parameter is the beam power reaching the work-piece, since the depth of the weld is directly related to such beam power (for a given set of other conditions). The above-described known process is deficient in that it does not provide an accurate measure of the current constituted by the electron-beam 14. A calibration of the current meter 11 against true work-piece current (i.e. against the true value of the current constituted by the beam 14) could be made, before carrying out an actual welding operation upon a work-piece, by introducing a small "Faraday chamber" (i.e. an electrically-conductive box having a hole for admitting the electron beam) into the vacuum chamber 2 so as to collect the total work-piece current; the "Faraday chamber" is electrically insulated from the housing 1 and electron gun, and the current collected thereby is measured separately to give the true electron-beam current. Optimal welding conditions for a work-piece are generally determined empirically, and in subsequent similar welding operations it is clearly desirable to maintain these optimal conditions, for example by maintaining the optimal value of the true electron-beam welding current. However, the current intercepted by the anode and any beam stops of the electron gun is dependent upon the precise relative positioning of the gun cathode, anode and other beam stops. Therefore, since the cathode position is subject to drift, due to thermal effects, and to sudden change when a cathode is replaced, checks on the electron-beam welding current have to be repeated realtively frequently in order to be effective, thus necessitating undesirably frequent interruption of a succession of similar welding operations. For this purpose the "Faraday chamber" may be left inside the chamber 2 and moved under the beam 14 at the necessary frequent intervals to check the beam current when required. Even so, this clearly does not provide a true measure of the work-piece current while welding is actually taking place.

In order to obtain continuous monitoring of the true electron-beam welding current, falling upon the work-piece, it is possible to insulate the work-piece electrically from the rest of the set-up, and connect it directly back to the power supply via a current meter. However, in order to avoid an unduly low current indication, owing to emission of secondary electrons from the workpiece, it is necessary to apply a positive potential of say 50 volts to the work-piece with respect to its surroundings. The present invention is concerned to provide for continuous accurate monitoring of the electron-beam welding current, without the need for a positive bias voltage on the work-piece.

According to the present invention, an embodiment of which is illustrated in connection with FIG. 2, there is provided an electron-beam welding proceess wherein electrical insulation is provided between the electron-gun anode and an electrically-conductive housing the inner surface of which defines a chamber in which the work-piece is located, the said housing being in electrically-conductive connection with the work-piece and being formed with an aperture which allows the electron-beam from the gun to enter the chamber unimpeded, and wherein the housing is connected so that the electron-beam current entering the chamber returns via an electric current meter to the electron-gun power supply, there being between the electron-gun anode and the power supply a connection whereby electrons removed from the electron beam before it reaches the said aperture return to the power supply without passing through the current meter and wherein the electrically-conductive housing defining the said chamber itself acts as a Faraday chamber for monitoring the true beam current impinging on the work-piece. It will be appreciated that the said aperture should allow the electron-beam from the gun to enter the chamber without permitting any substantial loss from the chamber of such secondary electrons as may be emitted from the work-piece. Preferably, the said aperture is circular with a radius which is not greater than one-tenth of the distance travelled by the electron beam from the aperture to the work-piece.

For the sake of the safety of the operators, the housing is preferably earthed.

Figure 2:
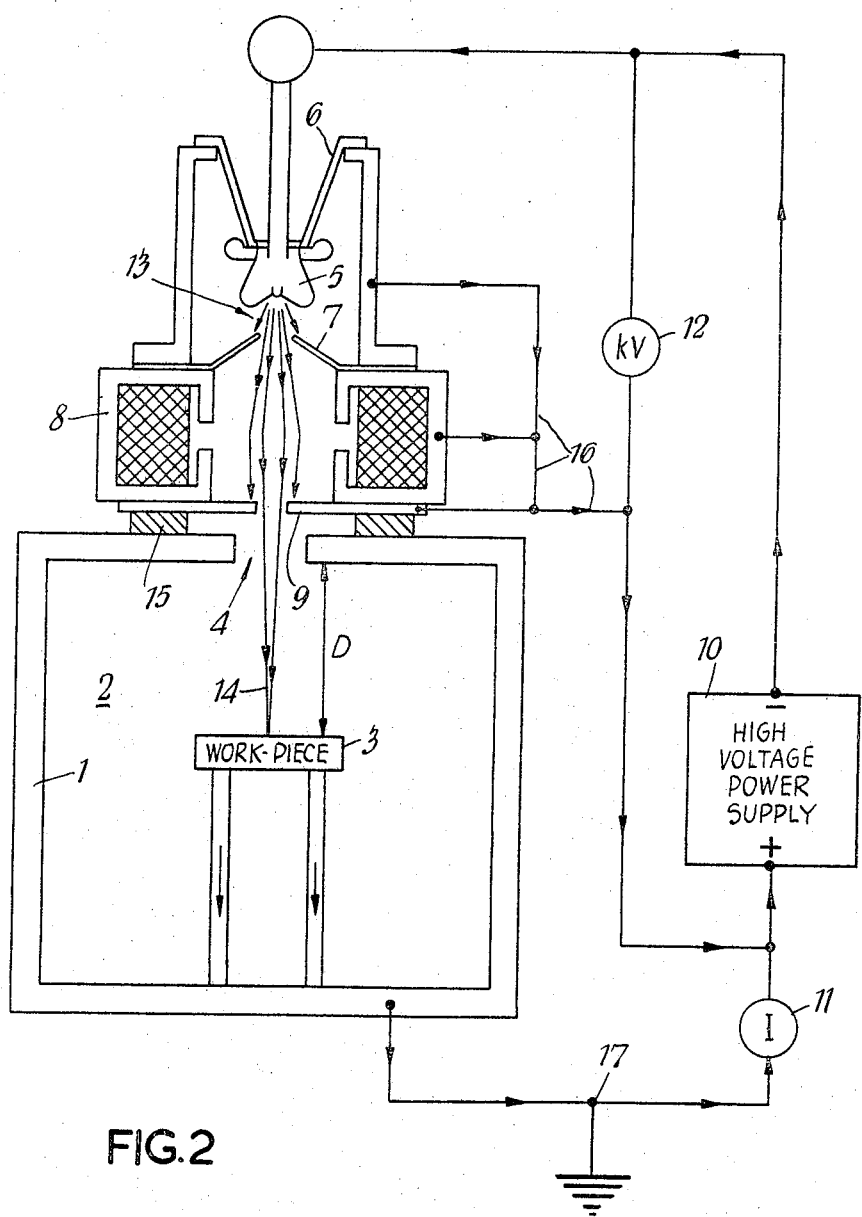
FIG. 2 is a view similar to that of FIG. 1 illustrating the manner in which the apparatus of FIG. 1 is modified for use in a welding process embodying the present invention.

The whole of the electron gun, as shown in FIG. 2, including all deliberate beam stops and other current intercepting structures such as the anode 7, is electrically insulated from the housing 1, by means of a polythene ring 15, in such a way as to maintain vacuum-tight the passageway from the gun to the chamber 2. Connections 16 are provided, between the electron gun and the positive pole of the power supply 10, for returning the intercepted electron current to the power supply without passing through the meter 11.

The aperture 4 in the housing 1 is so much larger than the aperture of the beam stop 9 as to ensure that the electron-beam 14 leaving the electron-gun assembly enters the chamber 2 unimpeded, but the aperture 4 is not so large as to allow appreciable numbers of secondary or back-scattered electrons to escape from the chamber 2. For example, the ratio of the radius of the aperture 4 to the working distance D should not exceed about 1:10 if the current is to be measured with an accuracy of about 1%. A radius of 1 cm. is convenient for the aperture 4 in the case of 100 kv. to 150 kv. electron-beam welding set-ups The current indicated by the meter 11 is thus simply the current which enters the work chamber 2, being focused on the work-piece 3 and thus constituting the true electron-beam welding current. Use of the housing 1 itself in electrical connection with the work-piece 3 enables errors due to loss of high-energy back-scattered electrons (greater than 50 ev.) as well as errors due to the loss of low-energy secondary electrons (less than 50 ev.) to be substantially eliminated without using a positive bias voltage on the work-piece 3.

It will be appreciated that the meter 11 of FIGURE 2 could alternatively be placed in the electrical connecting line between the chamber 1 and the earth connecting point indicated at 17. However, the meter location indicated in FIGURE 2 is to be preferred, so as to maintain a safe earthing arrangement for the housing 1.

I claim:

1. A process of welding a workpiece with an electron-beam from an electron gun having a cathode for supplying electrons for the beam and an anode for accelerating those electrons, said process comprising the steps of connecting the electron gun with a power supply and applying an accelerating voltage therefrom to the electron gun, supporting the workpiece to be welded in a chamber defined by and within an electrically-conductive housing in electrically-conductive connection with the housing, said housing having an aperture through which the electron beam from the electron gun may enter the chamber unimpeded, directing an electron beam from the gun through said aperture and impinging it upon the workpiece, and connecting an electric current meter between the housing and the power supply to return the electron beam current entering the chamber to the power supply via the current meter, wherein the improvement comprises the further steps of providing electrical insulation between the electron-gun anode and the electrically-conductive housing, and electrically connecting the electron-gun anode to the power supply for returning electrons removed from the electron beam to the power supply before it reaches the said aperture, without having the electrons pass through the current meter, and wherein the electrically-conductive housing defining the said chamber itself acts as a Faraday chamber to monitor the true beam current impinging on the workpiece.

2. A process as claimed in claim 1, wherein the electrically-conductive housing is earthed.

3. A process as claimed in claim 1, wherein the said aperture is circular with a radius which is not greater than one-tenth of the distance travelled by the electron-beam from the aperture to the workpiece.

4. A process as claimed in claim 3, wherein the accelerating voltage applied to the electron-gun is in the range from 100 kv. to 150 kv., and the said radius is substantially 1 cm.

References Cited

UNITED STATES PATENTS

| | | | |
|---|---|---|---|
| 2,793,281 | 5/1957 | Steigerwald | 219—121 |
| 3,016,449 | 1/1962 | Steigerwald | 219—121 |
| 3,136,882 | 6/1964 | Radtke | 219—121 |
| 3,260,102 | 7/1966 | Werner | 219—121 |
| 3,291,959 | 12/1966 | Schleich et al. | 219—121 |
| 3,408,474 | 10/1968 | Downing | 219—121 |
| 3,413,517 | 11/1968 | Barber et al. | 219—121 |

JOSEPH V. TRUHE, Primary Examiner

W. D. BROOKS, Assistant Examiner

U.S. Cl. X.R.

250—49.5